(12) United States Patent
Kim

(10) Patent No.: US 9,141,712 B2
(45) Date of Patent: Sep. 22, 2015

(54) SEQUENTIAL WEBSITE MOVING SYSTEM USING VOICE GUIDE MESSAGE

(75) Inventor: Soo-Hyun Kim, Buchun-si (KR)

(73) Assignee: NEOV CO., LTD., Seoul (KR)

( * ) Notice: Subject to any disclaimer, the term of this patent is extended or adjusted under 35 U.S.C. 154(b) by 400 days.

(21) Appl. No.: 13/522,197

(22) PCT Filed: May 13, 2011

(86) PCT No.: PCT/KR2011/003535
§ 371 (c)(1),
(2), (4) Date: Jul. 13, 2012

(87) PCT Pub. No.: WO2011/145834
PCT Pub. Date: Nov. 24, 2011

(65) Prior Publication Data
US 2013/0080877 A1 Mar. 28, 2013

(30) Foreign Application Priority Data
May 17, 2010 (KR) ........................ 10-2010-0045938

(51) Int. Cl.
*G06F 17/00* (2006.01)
*G06F 17/30* (2006.01)
*G06F 3/16* (2006.01)

(52) U.S. Cl.
CPC .......... *G06F 17/30873* (2013.01); *G06F 3/167* (2013.01); *G06F 17/30899* (2013.01)

(58) Field of Classification Search
CPC .................. G06F 17/30864; G06F 17/30613; G06F 17/30873; G06F 17/30899
See application file for complete search history.

(56) References Cited

U.S. PATENT DOCUMENTS

| 6,823,311 | B2 | 11/2004 | Tetsumoto |
| 7,197,462 | B2* | 3/2007 | Takagi et al. ................. 704/275 |
| 7,712,020 | B2* | 5/2010 | Khan ............................ 715/205 |
| 2002/0120645 | A1* | 8/2002 | Adapathya et al. ........ 707/501.1 |
| 2007/0234213 | A1* | 10/2007 | Krikorian et al. ............. 715/716 |

FOREIGN PATENT DOCUMENTS

| JP | 2002014893 | 1/2002 |
| JP | 2002352212 | 11/2002 |
| JP | 2006139521 | 6/2006 |
| KR | 100747724 | 8/2007 |

* cited by examiner

*Primary Examiner* — Kavita Padmanabhan
*Assistant Examiner* — Ariel Mercado
(74) *Attorney, Agent, or Firm* — IPLA P.A.; James E. Bame

(57) ABSTRACT

A sequential website moving system using a voice guide message comprises: a web server management module which receives registered information on a web page operated on a web server in a web server DB; a web server keyword management module which is provided with a keyword of the web page, in a keyword DB; a web browser analysis module which recognizes the content of the web page displayed on a web browser of a client terminal, selects a word or the context of the web page as a representative word in a representative word DB; a voice guide message generation module which compares the representative word with the keyword, links the web page registered on the web server with the corresponding keyword if the matched keyword exists, and generates the linked page as a voice guide message of the displayed web page; and a voice guide message display module.

9 Claims, 4 Drawing Sheets

SEQUENTIAL WEBSITE MOVING SYSTEM USING VOICE GUIDE MESSAGE

BACKGROUND OF THE INVENTION

1. Field of the Invention

The present invention relates to a sequential website moving system using a voice guide message which analyzes the contents of a web page displayed in the web browser of a client terminal and provides information about other related websites in the form of a voice guide message, thereby enabling to move to another website without using a search site.

2. Background of the Related Art

In general, most of Internet users use a method of accessing a desired website while checking retrieved results displayed when inputting a specific word to the search window of a portal site which provides various pieces of information or a method of directly accessing a website by inputting the URL of the website to the connection window of a web browser if the URL of the website is known in order to obtain desired information through the Internet.

If an Internet user does not know a website that provides desired information precisely, however, the Internet user accesses a website by using a portal site. If a website clicked on as a retrieved result does not correspond to desired contents, the Internet user had to return to the portal site, check a retrieved result, and access to another website.

Meanwhile, there is a problem in that, although a user wants to access another website including desired contents even after accessing a desired website, the user has to move to a web page displaying retrieved results and then select another website.

Furthermore, while surfing common websites, a user may move to a website while checking advertisements, such as additional banners and floating provided by the website. However, there is a problem in that the advertisements, such as banners and floating, are not related to a website because they are arbitrarily installed by a website operator. Accordingly, the website had to be produced in such a way as to be extremely confused generally because it requires an additional region in order to expose the advertisements.

SUMMARY OF THE INVENTION

Accordingly, an object of the present invention is to provide a sequential website moving system using a voice guide message which analyzes the contents of a web page displayed in the web browser of a client terminal and provides information about other related websites in the form of a voice guide message, thereby enabling to move to another website without using a search site.

A sequential website moving system using a voice guide message of the present invention includes a web server management module for registering information about a web page operated in a web server and storing and managing the information in a web server database (DB); a web server keyword management module for receiving a keyword corresponding to the web page operated in the web server and storing and managing the keyword in a keyword DB; a web browser analysis module for recognizing the contents of a web page displayed in the web browser of a client terminal, selecting a word or context representing the web page as a representative word, and storing the selected representative word in a representative word DB; a voice guide message generation module for comparing the representative word, selected by the web browser analysis module, with a keyword stored in the keyword DB of the web server keyword management module and, if there is a keyword identical with the representative word, generating the web page registered in the web server in the form of a voice guide message which is displayed while linking the web page to the relevant keyword; and a voice guide message display module for outputting the voice guide message of the web page, generated by the voice guide message generation module, in voice while the web page is displayed in the web browser of the client terminal.

Preferably, the voice guide message generation module provides selection numbers so that a client user distinguishes the voice guide messages from each other.

Preferably, a client selection check module for recognizing a keypad, corresponding to the voice guide message, as a selection signal when the keypad is selected in the client terminal while the voice guide message is displayed in the web browser of the client terminal and outputting a web page of a selected sponsor to the web browser of the client terminal is further included.

Preferably, if the contents of the web page correspond to a result of search through a search site, the web browser analysis module selects a search word as the representative word.

Preferably, the web browser analysis module analyzes the morpheme of the contents of the web page and selects a representative word of the web page according to a result of the analysis or, if an image or moving image is included in the contents of the web page, analyzes information describing the image or moving image and selects a word, representing the image or moving image, as the representative word.

DETAILED DESCRIPTION OF EMBODIMENTS

Hereinafter, embodiments of the present invention are described in detail with reference to the accompanying drawings.

Figure 1:
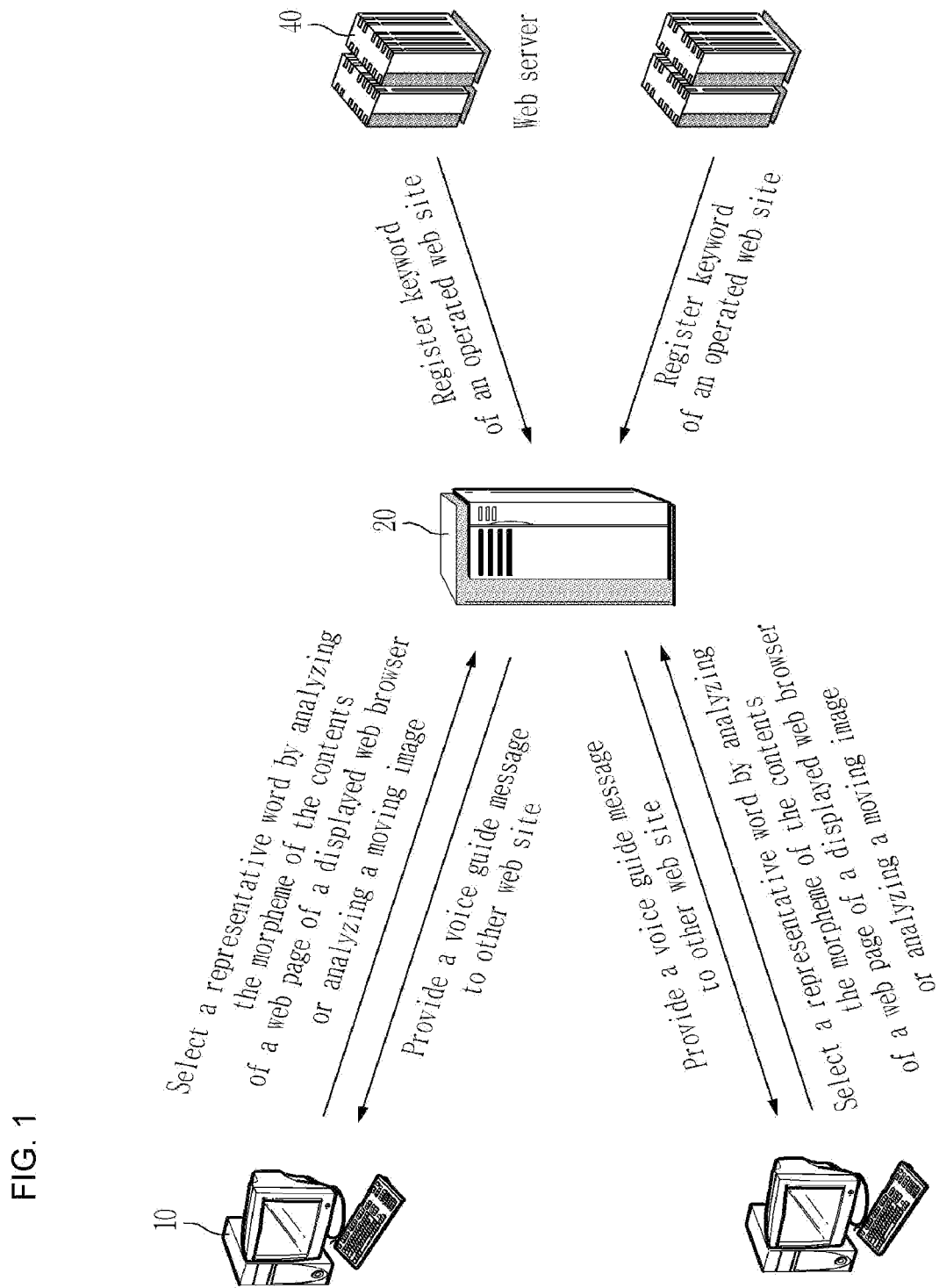
FIG. 1 is a schematic diagram of a sequential website moving system using a voice guide message according to the present invention.

As shown in FIG. 1, a basic concept of the present invention lies in that a website moving management server 20 analyzes the contents of a web page displayed in client terminals 10 in real time and provides guidance for information about other web pages registered with a web server 40 in voice, so that a user can sequentially move to another web page related to a current web page even without an additional search process.

Figure 2:
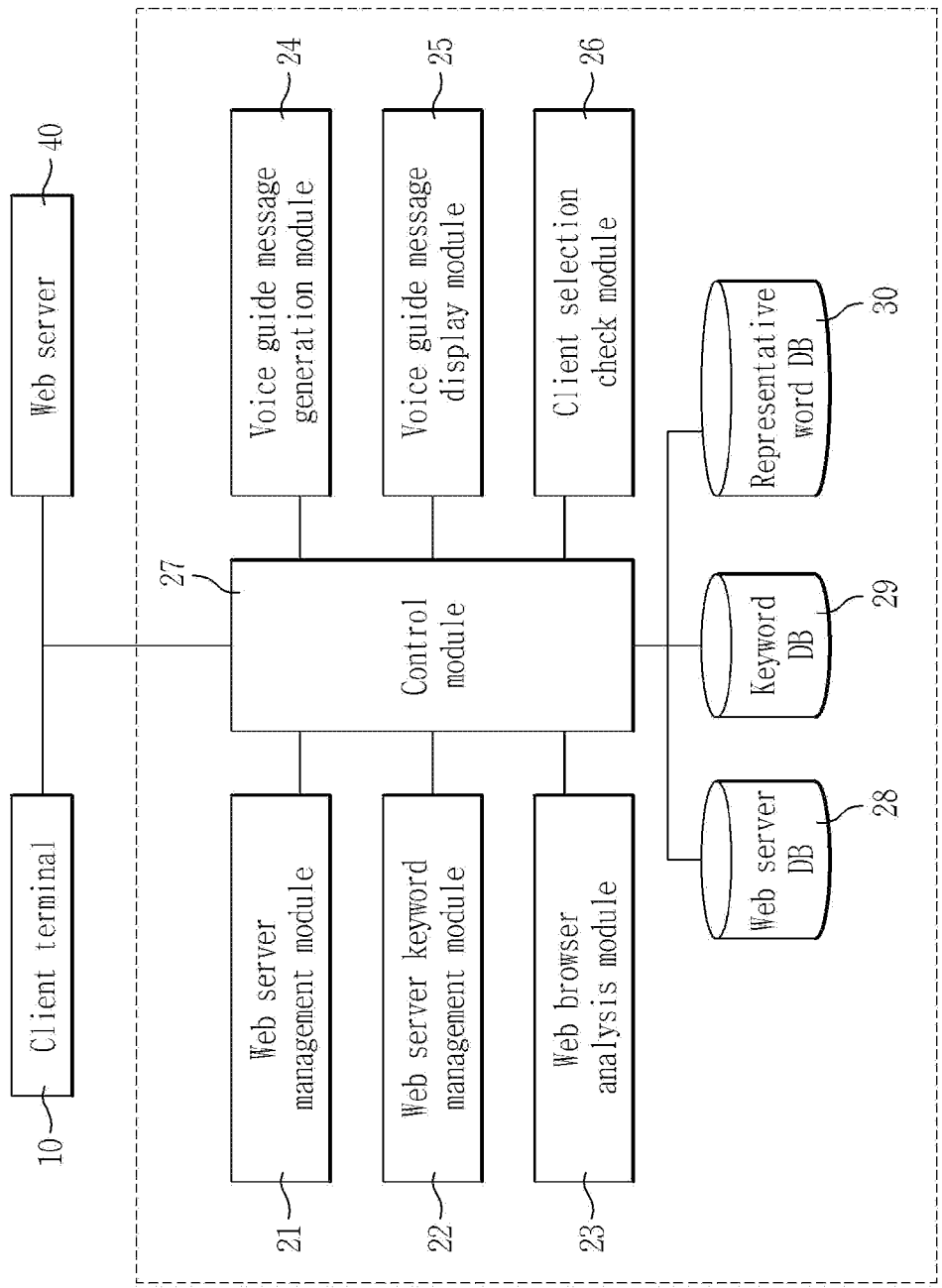
FIG. 2 is a block diagram of a sequential website moving management server using a voice guide message according to the present invention.

The sequential website moving management server using a voice guide message is described in detail with reference to FIG. 2. The management server 20 includes a web server management module 21, a web server keyword management module 22, a web browser analysis module 23, a voice guide message generation module 24, a voice guide message display module 25, a client selection check module 26, and a control module 27.

Pieces of information about web pages operated in the web server are registered with the web server management module 21 and are stored and managed in a web server DB 28. Here, the pieces of information about the web pages of the web server include the URLs of the respective web pages.

A keyword corresponding to web pages operated in the web server is registered with the web server keyword management module 22 and is stored and managed in a keyword DB 29. Here, the number of keywords may be one or plural for all web pages operated in the web server.

The web browser analysis module 23 recognizes the contents of a web page displayed in the web browser of the client terminal 10, selects a word or context that represents a web page as a representative word, and stores the representative word in a representative word DB 30. Here, the contents of the web page displayed in the web browser include all the web pages of common sites, pages appearing as a result of search through a search site, and pages related to news and individual sites.

Figure 4:
FIG. 4 is an exemplary diagram showing an analysis of the morpheme of a web page according to the present invention.

For example, if the contents of a web page correspond to a page appearing as a result of search through a search site, a search word may be selected as a representative word or the morpheme of the contents of the web page may be analyzed and the representative word of the web page may be selected according to a result of the analysis. If an image or moving image is included in the contents of the web page, information that describes the image or moving image may be analyzed and a word that represents the image as a result of the analysis may be selected as the representative word. Furthermore, if the contents of a web page correspond to a common web page as shown in FIG. 4, 'KIA MOTORS', that is, the most preferred word or context, from among major words or context used to analyze the morpheme of the web page, that is, KIA MOTORS, K5, a motor show, and SPORTAGE, may be selected as a representative word.

The voice guide message generation module 24 compares a representative word, selected by the web browser analysis module 23, with a keyword stored in the keyword DB 29 of the web server keyword management module 22 and, if, as a result of the comparison, there is a keyword identical with the representative word, generates the relevant keyword in the form of a voice guide message. Here, the voice guide message is linked to a web page corresponding to a selected keyword, and a selection number, together with the voice guide message, is provided so that a client user can distinguish the voice guide messages from each other. For example, if 'KIA MOTORS' is selected as a keyword, voice guide messages, such as "No. 1 Do you want to move to the KIA MOTORS sales site?", "No. 2 Do you want to move to the KIA MOTORS new type site?", "No. 3 Do you want to move to the KIA MOTORS used car sales site?", and "No. 4 Do you want to move to the KIA MOTORS agent?", and a guide message reading "When moving, please press a relevant keypad" are generated. The relevant keypad may be set in a number key, a special key, or the Enter key corresponding to the order of a voice guide message. Meanwhile, if a number of sponsor web pages exists in the same keyword, the sponsor web pages may be controlled so that they are sequentially selected.

The voice guide message display module 25 outputs the voice guide message of a web page, generated by the voice guide message generation module 24, in voice while the web page is displayed in the web browser of the client terminal.

When a number corresponding to a voice guide message is selected in the client terminal while the voice guide message is displayed in the web browser of the client terminal, the client selection check module 26 recognizes the selected number as a selection signal and outputs the web page of a selected sponsor through the web browser of the client terminal. For example, when a number "2" is inputted through the client terminal while "No. 1 Do you want to move to the KIA MOTORS sales site?", "No. 2 Do you want to move to the KIA MOTORS new type site?", "No. 3 Do you want to move to the KIA MOTORS used car sales site?", and "No. 4 Do you want to move to the KIA MOTORS agent?" are outputted as voice guide messages, the client selection check module 26 checks that the second voice guide message, that is, "Do you want to move to the KIA MOTORS new type site?", has been selected and thus outputs a relevant web page. Furthermore, when a key, such as the Enter key, is pressed while a relevant voice guide message is outputted, the client selection check module 26 may recognize that the outputted voice guide message has been selected and output a relevant web page.

Furthermore, if the number of voice guide messages is one, the client selection check module 26 may recognize that the voice guide message has been selected by a client and output a web page linked to the voice guide message.

Furthermore, the control module 27 controls the flow of data between the modules 21 to 25.

Figure 3:
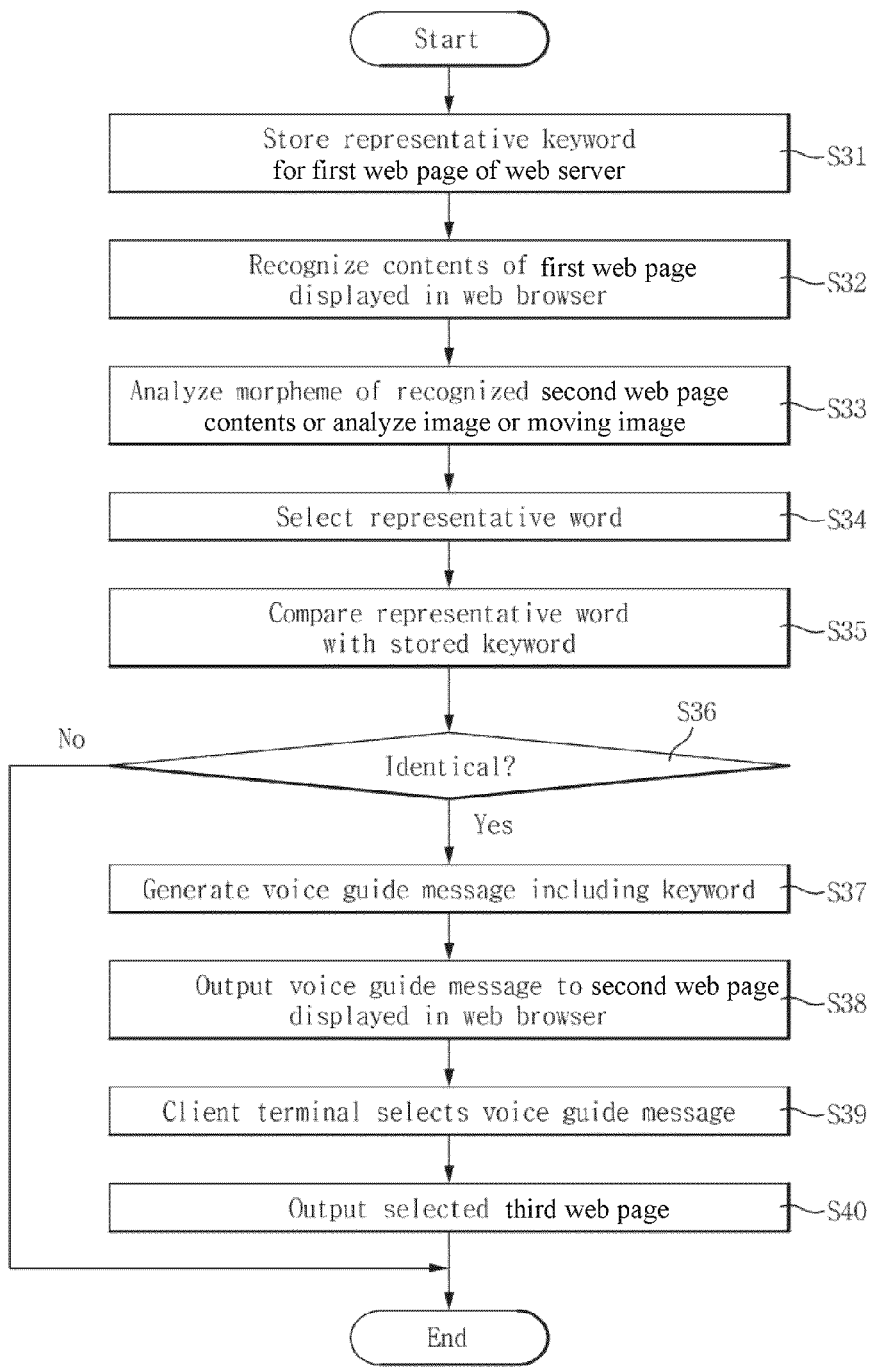
FIG. 3 is a flowchart of the operational process of the sequential website moving system using a voice guide message according to the present invention.

The operational process of the sequential website moving system using a voice guide message according to the present invention is described in detail below with reference to the flowchart of FIG. 3.

First, the web server keyword management module 22 of the management server receives a keyword corresponding to a first web page of the web server which has been registered with the web server management module 21 and stores the received keyword in the keyword DB 29 (step S31). Here, only one keyword may be set for all firm web pages, or a different keyword may be set for each first web page.

When a second web page is displayed in the web browser of the client terminal 10, the web browser analysis module 23 recognizes the contents of the displayed second web page (step S32), selects a word or context that represents the recognized contents as a representative word, and stores the selected word or context in the representative word DB 30 (steps S33 and S34). Here, if the contents of the second web page correspond to a result of search for a search site, a search word may be selected as the representative word or the morpheme of the contents of the second web page may be analyzed and the representative word of the second web page may be selected according to a result of the analysis. If an image or moving image is included in the contents of the second web page, information that describes the image or moving image may be analyzed and a word that represents the image as a result of the analysis may be selected as the representative word.

Next, the voice guide message generation module 24 checks whether there is a keyword identical with the representative word selected by the web browser analysis module 23 by comparing the representative word with a keyword stored in the keyword DB 29 of the web server keyword management module 22 (step S35) and generates a third web page of the web server, including the relevant keyword, in the form of a voice guide message if, as a result of the comparison, there is a keyword identical with the representative word (steps S36 and S37). Here, the voice guide messages are assigned selection numbers, such as No. 1, No. 2, and No. 3 so that a client user can select the voice guide messages. Furthermore, if there are a number of web pages of sponsors generated in the form of a voice guide message, the sponsor web pages may be controlled so that they are circulated or selected according to the order of priority.

Furthermore, after the voice guide message generation module 24 generates the voice guide message for the third web page of the web server, the voice guide message output module 25 outputs the generated voice guide message in voice in the first web page displayed in the web browser of the client terminal (step S38).

Meanwhile, when a number corresponding to the voice guide message is selected in the client terminal (step S39) while the voice guide message is outputted in the web browser of the client terminal, the client selection check module 26 recognizes the selected number as a selection signal and outputs the web page of a selected sponsor through the web browser of the client terminal (step S40). For example, if it is checked that one of the selection numbers, such as No. 1, No. 2, and No. 3, has been selected through a keyboard, a relevant third web page is outputted. Here, if the number of voice guide messages is one, it may be recognized that the voice guide message has been selected by a client and thus a third web page linked to the voice guide message may be outputted.

In accordance with the sequential website moving system using a voice guide message of the present invention, there is an advantage in that movement to another website without using a search site is possible because information about another website related to a web page that is now being displayed in the web browser of a client terminal in real time is outputted to the web page in the form of a voice guide message.

Furthermore, there is an advantage in that a user who has visited a web page can consecutively move to other related websites easily because a highly relevant and important representative word in the contents of a web page displayed in the web browser of a client terminal can be precisely selected by analyzing the morpheme of the contents of the web page.

Furthermore, there is an advantage in that a guide message for another website is displayed in voice and simple movement to another site is possible when a selection keypad, such as 1 or 2, is pressed.

Furthermore, there is an advantage in that simple movement to another site is possible even without an additional region, such as the existing banner, in a displayed web page.

While the present invention has been described above with reference to the limited embodiments and drawings, the present invention is not limited to the limited embodiments and drawings. It is to be appreciated that those skilled in the art may change or modify the embodiments in various ways without departing from the scope of the present invention and the equivalent range of the claims to be described below.

What is claimed is:

1. A sequential website moving system using a voice guide message, comprising:
   a web server operating a first web page;
   a client terminal displaying a second web page in a web browser;
   a web server database (DB) configured for storing and managing registered information about the first web page in the web server database (DB);
   a keyword DB configured for receiving a keyword corresponding to the first web page and storing and managing the keyword in the keyword DB; and
   a representative word DB configured for recognizing contents of the second web page displayed in the web browser of the client terminal, selecting a word or context representing the second web page as a representative word, and storing the selected representative word in a representative word DB,
   wherein the representative word is received from the representative word DB, compared with a keyword stored in the keyword DB and if there is a keyword identical with the representative word, a voice guide message to a third web page registered in the web server is generated while linking the third web page to the relevant keyword, and
   wherein the voice guide message of the third web page is outputted in voice while the first web page is displayed in the web browser of the client terminal.

2. The sequential website moving system as claimed in claim 1, wherein the voice guide message is linked to the third web page corresponding to the selected keyword or the third web page linked to the voice guide message is opened.

3. The sequential website moving system as claimed in claim 1, wherein the voice guide message is provided with a selection number so that a client user distinguishes voice guide messages from each other.

4. The sequential website moving system as claimed in claim 3, further comprising a keypad configured for being recognized, corresponding to the voice guide message, as a selection signal when the keypad is selected in the client terminal while the voice guide message is displayed in the web browser of the client terminal and a web page of a selected sponsor is outputted to the first web browser of the client terminal.

5. The sequential website moving system as claimed in claim 4, wherein the keypad is any one selected from a number key corresponding to priority or setting of the voice guide message, a special key, and an Enter key pressed while the voice guide message is outputted.

6. The sequential website moving system as claimed in claim 1, wherein the keyword of the web server is one for all first web pages or is plural for all first web pages.

7. The sequential website moving system as claimed in claim 1, wherein if the contents of the second web page correspond to a result of search through a search site, a search word is selected as the representative word.

8. The sequential website moving system as claimed in claim 1, wherein a morpheme of the contents of the second web page is analyzed and a representative word of the second web page is selected according to a result of the analysis or, if an image or moving image is included in the contents of the second web page, information describing the image or moving image is analyzed and a word, representing the image or moving image, is selected as the representative word.

9. The sequential website moving system as claimed in claim 1, wherein if there are a number of sponsor web pages in an identical keyword, the sponsor web pages are sequentially selected.

* * * * *